United States Patent [19]

Takagi et al.

[11] Patent Number: 5,377,494

[45] Date of Patent: Jan. 3, 1995

[54] HEAT EXCHANGING APPARATUS AND A METHOD OF PREVENTING CORROSION

[75] Inventors: Shinya Takagi, Yamatotakada; Kazuaki Minato, Osaka; Masafumi Satomura, Nara, all of Japan

[73] Assignee: Sharp Kabushiki Kaisha, Osaka, Japan

[21] Appl. No.: 903,268

[22] Filed: Jun. 24, 1992

[30] Foreign Application Priority Data

Jun. 24, 1991 [JP] Japan ................................. 3-151426
Jun. 16, 1992 [JP] Japan ................................. 4-156580

[51] Int. Cl.⁶ ............................................ F25B 29/00
[52] U.S. Cl. ...................................... 62/102; 62/476; 62/DIG. 20
[58] Field of Search ................. 62/476, 101, 112, 114, 62/102, DIG. 20

[56] References Cited

U.S. PATENT DOCUMENTS

| | | | |
|---|---|---|---|
| 1,922,203 | 8/1933 | Hedlund | 62/489 |
| 2,755,170 | 7/1956 | Stubblefield | 62/DIG. 20 |
| 2,797,557 | 7/1957 | Kogel | 62/489 |
| 4,801,393 | 1/1989 | Erickson | 62/112 X |
| 4,912,934 | 4/1990 | Itoh et al. | 62/DIG. 20 |
| 5,127,234 | 7/1992 | Woods, Jr. | 62/476 |

OTHER PUBLICATIONS

Industrial Material List (First Edition) by Saichi Banno, Nikkan Industrial Newspaper, p. 934.
Proceedings International Congress Metals Corrosion, 1984, vol. 3, pp. 50–56.

*Primary Examiner*—Albert J. Makay
*Assistant Examiner*—William C. Doerrler
*Attorney, Agent, or Firm*—Birch, Stewart, Kolasch & Birch

[57] ABSTRACT

A heat exchanging apparatus includes a composite structure of a ferrosoferric oxide and a molybdenum oxide at the internal surface of a heat exchange cycle tube located in a generator. A process of suppressing corrosion of this heat exchanging apparatus includes the step of preparing an ammonia solution including dissolved oxygen of a concentration of approximately 3–8 ppm. Approximately 1 wt %–5 wt % molybdate is added into the ammonia solution. This ammonia solution is sealed within the heat exchange cycle tube to be heated to at least a predetermined temperature in the generator of the heat exchanging apparatus. Thus, a composite structure of a ferrosoferric oxide and molybdenum oxide is formed on the internal surface of the generator. This composite structure allows the suppression of corrosion in the internal surface of the generator.

8 Claims, 6 Drawing Sheets

HEAT EXCHANGING APPARATUS AND A METHOD OF PREVENTING CORROSION

BACKGROUND OF THE INVENTION

1. Field of the Invention

The present invention relates to a heat exchanging apparatus such as absorption refrigerating machines and heat pumps having a corrosion prevention function added, and a method of preventing corrosion therein.

2. Description of the Background Art

A heat exchanging apparatus such as an absorption refrigerating machine and a heat pump is well known. An absorption refrigerating machine will be described hereinafter as an example of a heat exchanging apparatus. The absorption refrigerating machine includes a household refrigerator. Refrigeration by this absorption refrigerating machine is carried out utilizing the cooling effect resulting from the evaporation of a liquid refrigerant. Although various kinds are available as a refrigerant, an embodiment of an absorption refrigerating machine using ammonia as a refrigerant and water as an absorbent will be described. This absorption refrigerating machine includes a generator, a rectifier, a condenser, an evaporator, and an absorber, whereby a refrigeration cycle is implemented.

Concentrated ammonia solution introduced into the refrigeration cycle is heated in the generator to be separated into vapor and ammonia gas. The vapor is then condensed in a rectifier, whereas ammonia gas is condensed in a condenser. This ammonia gas is fed to the evaporator as ammonia liquid. The vapor condensed in the rectifier is supplied to an absorber as dilute ammonia solution. In the evaporator, ammonia liquid is evaporated to extract latent heat of vaporization from its periphery, resulting in a refrigeration effect. Ammonia liquid after being evaporated is conducted to the absorber to be mixed with dilute ammonia solution. As a result, concentrated ammonia solution is produced in the absorber, which is conducted to the generator. This embodiment of a refrigeration cycle will be repeated.

The concentration of the concentrated ammonia solution fed to the generator is typically 30–35%. The heating temperature of the generator is approximately 170° C. The pressure in the generator is 15–20 Kg/cm². The pressure reaches 30 Kg/cm² in diffusion type generators. Carbon steel is typically known as the material that can be used under the above-described conditions. Carbon steel is said to be corrosion-resistant to ammonium and ammonia solution. However, in practice, it will corrode in places which achieve high temperature and high pressure such as in a generator. If corrosion-preventing measures are not taken such as adding an appropriate corrosion inhibitor in the ammonia solution, the generator will be corroded and damaged on account of its high pressure interior.

A strong oxidant such as chromate which is an inorganic based oxidant is often used as a corrosion inhibitor. Chromate is added into an ammonia solution and sealed within the refrigeration cycle. On operating the absorption refrigerating machine, a thin layer is formed on the internal surface of the generator by oxidation of chromate. This thin layer serves to prevent corrosion.

Although the above-described chromate is superior regarding corrosion-resistant performance, $Cr^{6+}$ has a disadvantage of industrial pollution because of its strong toxicity.

SUMMARY OF THE INVENTION

An object of the present invention is to provide a heat exchanging apparatus having a superior corrosion suppressing function without pollution, and a method of preventing corrosion.

A heat exchanging apparatus according to the present invention utilizes as a medium ammonia solution circulating through a heat exchange cycle tube including iron based material. In order to achieve the above object, the heat exchanging apparatus according to the present invention has a composite structure including a ferrosoferric oxide and a molybdenum oxide in the internal surface of a heat exchange cycle tube where ammonia solution is transformed into a gas-phase state by being heated.

In the above-described heat exchange cycle tube, the portion where ammonia solution is transformed into a gas-phase state is implemented with an iron based material. In this portion, a composite structure including a molybdenum oxide and a ferrosoferric oxide is formed. This composite structure is superior in corrosion-resistance to enable significant suppression of corrosion.

The above-described heat exchanging apparatus is preferably an absorption refrigerating machine or an absorption heat pump.

The heat exchanging apparatus according to the present invention has ammonia solution including molybdate sealed in a heat exchange cycle tube for circulating a refrigerant. By operating the heat exchanging apparatus, the above described composite structure is formed. Corrosion can be suppressed significantly by the composite structure.

A method of preventing corrosion in a heat exchanging apparatus according to the present invention includes the step of preparing ammonia solution including dissolved oxygen of a predetermined concentration. Then, molybdate of an amount corresponding to the concentration of the dissolved oxygen is added into the ammonia solution. The ammonia solution including molybdate is heated, whereby a composite structure including a ferrosoferric oxide and a molybdenum oxide is formed at a desired portion on the internal surface of the heat exchange cycle tube.

Upon addition of molybdate into the ammonia solution, molybdate is dissociated in ammonia solution to exist as positive ions and $MoO_4^{2-}$. This $MoO_4^{2-}$ increases the oxidation of the dissolved oxygen to turn the dihydric iron ions eluted in the ammonia solution into an insoluble ferrosoferric oxide ($Fe_3O_4$). This ferrosoferric oxide ($Fe_3O_4$) is formed on the surface of the iron based material (the inner face of the heat exchange cycle tube). As a result, corrosion can be prevented.

The oxidation of the above-described $MoO_4^{2-}$ is per se weak. Therefore, the above-described oxidation can be achieved upon the addition of the oxidation of the dissolved oxygen of a predetermined amount. In other words, the above-described oxidation is carried out by adjusting appropriately the conditions such as the concentration of the dissolved oxygen and the amount of molybdate to be added. The $MoO_4^{2-}$ after oxidizing the surface of the iron based material is, per se, reduced. Thus, a molybdenum oxide (for example $MoO_2$) is formed on the surface of the above-described ferrosoferric oxide ($Fe_3O_4$). This can further improve the corrosion effect. By adjusting conditions appropriately such as the concentration of the dissolved oxygen and the amount of molybdate to be added, a desired portion in the internal surface of the heat exchange cycle tube can be made passive to effectively prevent corrosion.

The concentration of the dissolved oxygen is preferably at least 3 ppm. The amount of molybdate to be added is preferably at least 1 wt %. Molybdate is preferably ammonium molybdate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
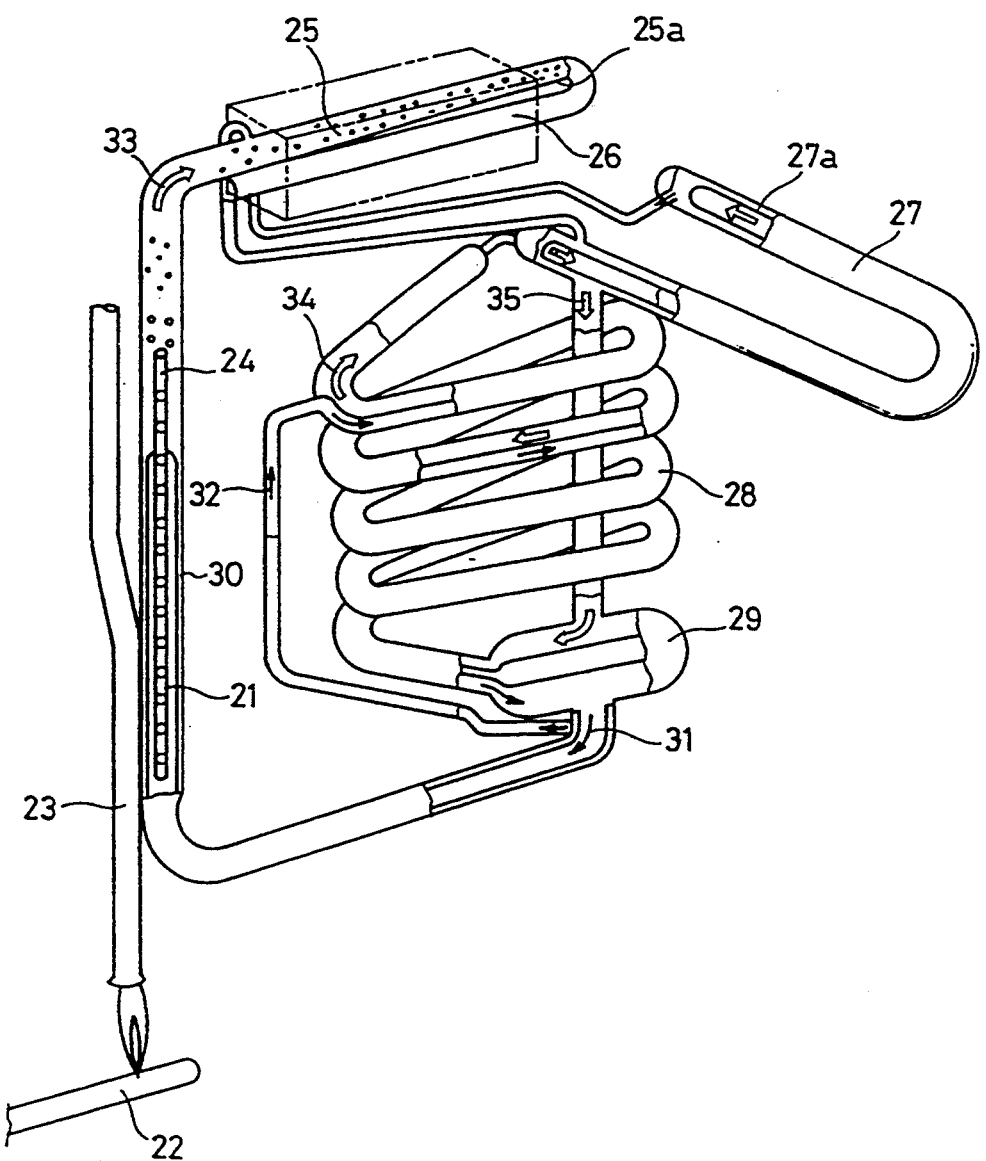
FIG. 1 is a partial perspective view of a diffusion absorption refrigerating machine according to an embodiment of the present invention.

The process of selecting a molybdate, specifically ammonium molybdate, as the corrosion inhibitor will first be described. Under the requirements of obtaining nontoxicity and superior corrosion-resistance, molybdate, tungstate, BTA (benzotriazole), dissolved oxygen removing process (at most 0.03 ppm), compound process and the like were selected, whereby a qualitative corrosion test thereof was carried out. The details of the qualitative corrosion test was as follows.

As a corrosion test device, a STS-35 type test vessel 1 having both aperture ends sealed was prepared with a quick release valve 2 inserted. Ammonia solution 8 of 30% concentration was introduced into test vessel 1 to be raised to 170° C. in an oil bath. This state was maintained for 1200 hours. Then, vessel 1 was broken and the internal face thereof was observed visually. The methods of corrosion resistance and the conditions of the corrosion test are shown in Table 1 with the results thereof.

TABLE 1

| No | Method of Corrosion Resistance | Processing Conditions or Treatment | Note | Result |
|---|---|---|---|---|
| 1 | Thermal Oxidation Process | 430° C. × 0.5 h | $Fe_3O_4$, $\alpha$-$Fe_2O_3$ | Δ |
| 2 | Compound Process | chromate | $Cr_2O_3$, $CrO_3$ | Δ |
| 3 | Compound Process | zinc phosphate | $Zn_3(PO_4)_2$ | x |
| 4 | Compound Process | blackening oxidization | $Fe_3O_4$ | Δ |
| 5 | Compound Process | ferric phosphate | $FePO_4$ | Δ |
| 6 | Plating | electroless nickel plating | Ni | x |

TABLE 1-continued

| No | Method of Corrosion Resistance | Processing Conditions or Treatment | Note | Result |
|---|---|---|---|---|
| 7 | Corrosion Inhibitor | benzotriazole $C_6H_4NHN_2$ | 3 wt % | x |
| 8 | Corrosion Inhibitor | sodium molybdate $Na_2MoO_4.2H_2O$ | 3 wt % | x |
| 9 | Corrosion Inhibitor | ammonium molybdate $(NH_4)_6Mo_7O_{24}.4H_2O$ | 3 wt % | o |
| 10 | Corrosion Inhibitor | ammonium tungstate $(NH_4)_{10}W_{12}O_{43}.5H_2O$ | 3 wt % | x |
| 11 | Corrosion Inhibitor (conventional) | potassium dichromate $K_2Cr_2O_7$ | 3 wt % | o |
| 12 | Dissolved Oxygen Removal | Boiling, Reduced Pressure | 0.03 ppm | Δ |

<Evaluation of corrosion>
o: good
Δ: slightly inferior
x: bad (damage observed such as stimulation of corrosion or local corrosion)

The above processes of thermal oxidation, compounding, and plating in Table 1 were applied in advance to test vessel 1 to form the thin layer followed by the corrosion test. The thin layer formed after each process is described in the column of Note. Regarding the corrosion inhibitor, a 3% by weight corrosion inhibitor was added to the ammonia solution, and then the corrosion test was carried out. A similar corrosion test was carried out for potassium dichromate as a comparison of a conventional method. The corrosion test was also carried out where the dissolved oxygen in the ammonia solution was removed by boiling, pressure reduction and the like, so that the concentration of the dissolved oxygen was adjusted to be not more than 0.03 ppm.

Regarding the corrosion test of Table 1, the evaluation was carried out visually, resulting in the symbols of o, Δ, and x. The evaluation of o represents superior corrosion suppression. The evaluation of Δ means that the corrosion suppression effect is slightly inferior to that of the o evaluation. The evaluation of x indicates that an obvious damage was confirmed such as stimulation of corrosion or local corrosion.

It is appreciated from the above qualitative corrosion result that ammonium molybdate and potassium dichromate exhibited a superior corrosion suppressing function. However, molybdate differs basically from chromate in that it, per se, is not a strong oxidant, and the corrosion suppressing function thereof is not thoroughly sufficient. It is considered that the aid of the oxidation of the dissolved oxygen is required to exhibit a superior corrosion suppressing function. A quantitative corrosion test was also carried out to confirm various conditions such as the amount of addition and the like which will be described hereinafter.

Figure 7:
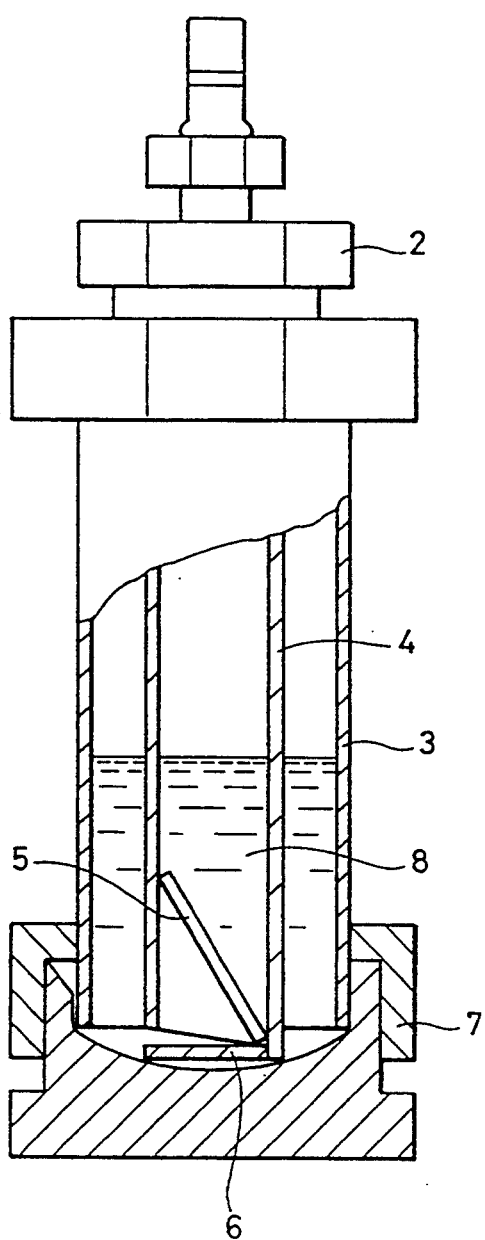
FIG. 7 is a partial sectional view of a test vessel used in quantitative corrosion testing.

FIG. 7 shows an experiment device for carrying out a quantitative corrosion test. The test vessel has a double layered structure where a polytetrafluoroethylene tube 4 is provided in the internal of a SUS304 tube 3. The double-layered tube has one opening end fitted with a quick release valve 2 and the other opening end fitted with a polytetrafluoroethylene plate 6. A tube fitting 7 is fitted so as to enclose the polytetrafluoroethylene plate 6. The test vessel is sealed by the quick release valve 2 and the tube fitting 7.

A specimen of STS-35 having an outer surface area of 10 cm$^2$ is sealed in the test vessel under vacuum. Then, a test solution of a predetermined amount is introduced thereto through the quick release valve 2. This test vessel was maintained at 170° C. in an oil bath for 1000 hours. Tube fitting 7 was taken off to unseal the test vessel. The specimen was taken out to have its weight measured. The amount of weight loss was measured by comparing the weight of the specimen before and after the test. Various test solutions used in the quantitative corrosion test were as follows.

| Test Solution A: | $NH_4OH$ | 30 wt % |
| --- | --- | --- |
| | $(NH_4)_6Mo_7O_{24}$ | 0.3 wt % |
| | Dissolved Oxygen Concentration | 6–8 ppm |
| Test Solution B: | $NH_4OH$ | 30 wt % |
| | $(NH_4)_6Mo_7O_{24}$ | 1.0 wt % |
| | Dissolved Oxygen Concentration | 6–8 ppm |
| Test Solution C: | $NH_4OH$ | 30 wt % |
| | $(NH_4)_6Mo_7O_{24}$ | 2.0 wt % |
| | Dissolved Oxygen Concentration | 6–8 ppm |
| Test Solution D: | $NH_4OH$ | 30 wt % |
| | $(NH_4)_6Mo_7O_{24}$ | 3.0 wt % |
| | Dissolved Oxygen Concentration | 6–8 ppm |
| Test Solution E: | $NH_4OH$ | 30 wt % |
| | $(NH_4)_6Mo_7O_{24}$ | 5.0 wt % |
| | Dissolved Oxygen Concentration | 6–8 ppm |
| Test Solution F: | $NH_4OH$ | 30 wt % |
| | $(NH_4)_6Mo_7O_{24}$ | 1.0 wt % |
| | Dissolved Oxygen Concentration | 0.03 ppm |
| Test Solution G: | $NH_4OH$ | 30 wt % |
| | $K_2Cr_2O_7$ | 3.0 wt % |
| | Dissolved Oxygen Concentration | 6–8 ppm |
| Test Solution H: | $NH_4OH$ | 30 wt % |
| | $K_2Cr_2O_7$ | 1.0 wt % |
| | Dissolved Oxygen Concentration | 0.03 ppm |

The test solutions of A, B, C, D, and E have 0.3, 1.0, 2.0, 3.0, and 5.0 wt % ammonium molybdate added, respectively, to a 30 wt % ammonia solution with dissolved oxygen of 6–8 ppm concentration. The degree of corrosion suppressing function depending upon the added amount of ammonium molybdate was identified. Test solution F had the same amount of ammonium molybdate added as in test solution B, with the concentration of the dissolved oxygen adjusted to 0.03 ppm. The influence of dissolved oxygen concentration can be identified.

Test solution G has a 3.0 wt % potassium dichromate added into the ammonia solution for comparison with a conventional method. Test solution H has a 1.0 wt % potassium dichromate added to ammonia solution, with the concentration of the dissolved oxygen adjusted to 0.03 ppm. The results of the quantitative corrosion test using the above-described test solutions are shown in Table 2.

TABLE 2

| Test Solution | Corrosion Amount (mg/cm$^2$) |
| --- | --- |
| A | 4.6 |
| B | 0 |
| C | 0 |
| D | 0 |
| E | 0 |
| F | 0.2 |
| G | 0 |
| H | 0 |

It can be appreciated from Table 2 that there was no progress in corrosion where the concentration of ammonium molybdate was 1.0 wt %–5.0 wt %, exhibiting a superior corrosion suppressing function. The critical value of inducing corrosion is considered to be from 0.3 wt % to 1 wt % of the concentration of ammonium molybdate. In comparing the corrosion suppressing function of a conventionally used potassium dichromate, a similar level of function can be seen where the concentration of the dissolved oxygen was 6–8 ppm. However, it was noted that the corrosion suppressing function of ammonium molybdate was slightly inferior to other cases such as test solution F where the concentration of dissolved oxygen was 0.03 ppm. There was no progress of corrosion in test solution H where potassium dichromate was added and the concentration of dissolved oxygen adjusted to 0.03 ppm. This was considered to be caused by a difference in oxidation between potassium dichromate and ammonium molybdate. However, ammonium molybdate exhibited a superior corrosion suppressing function similar to that of potassium dichromate by adjusting adequately the concentration of dissolved oxygen. The concentration of dissolved oxygen in water is within the range of 6–8 ppm. Since the actual measured concentration of dissolved oxygen is approximately 6–8 ppm in water, particular adjustment of dissolved oxygen is not required when an ammonia solution including dissolved oxygen of this concentration is used.

Figure 4:
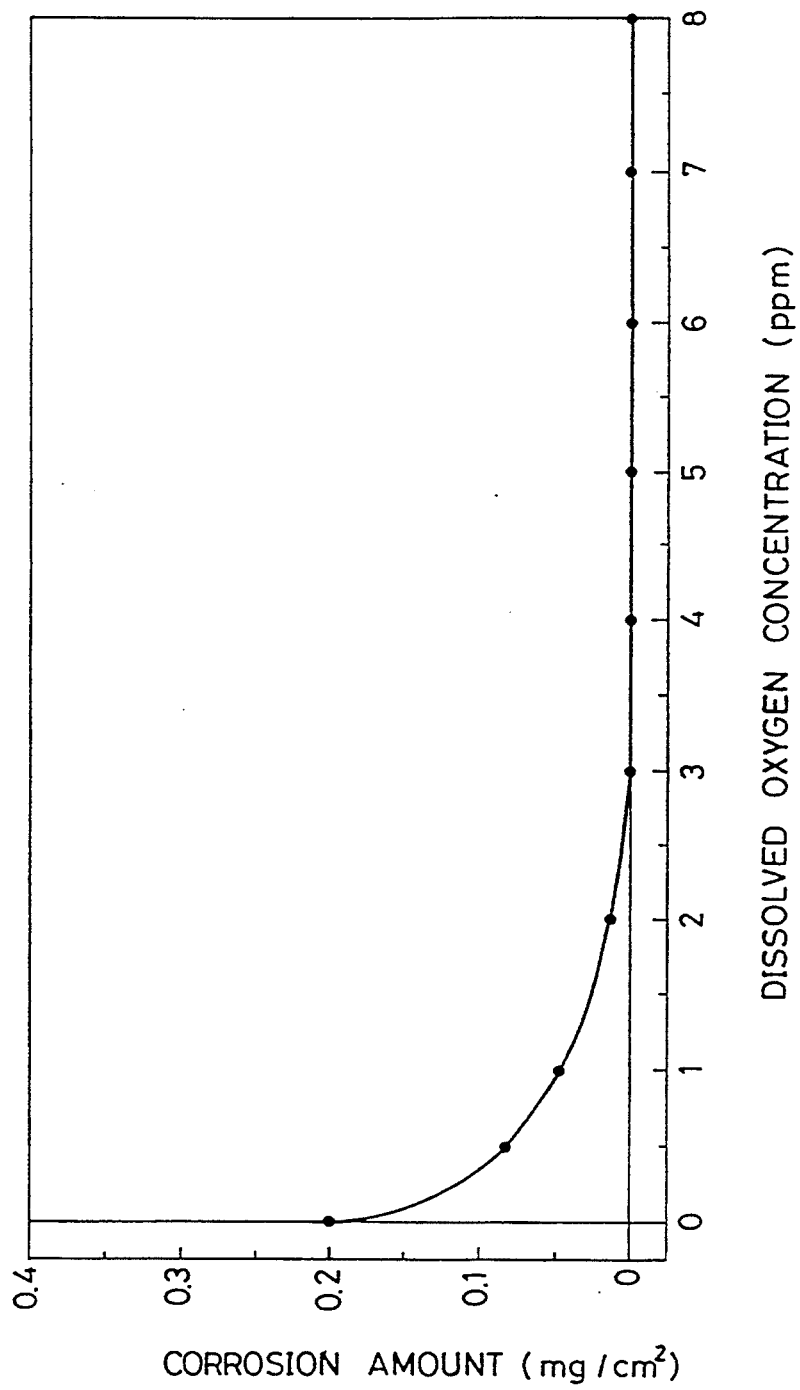
FIG. 4 shows the relationship between the concentration (ppm) of dissolved oxygen and the amount of corrosion (mg/cm$^2$)

The required amount of dissolved oxygen will be described in detailed hereinafter with reference to FIG. 4. FIG. 4 shows the result of a test carried out for identifying the effect of the concentration of dissolved oxygen with respect to the amount of corrosion. The test was carried out using an ammonia solution of approximately 30% concentration having the concentration of dissolved oxygen adjusted to take various values (approximately 0 ppm–approximately 8 ppm). Ammonium molybdate of approximately 3% by weight was added into the prepared ammonia solution. Specimens were immersed in the resultant solution to be subjected to heat treatment for 1000 hours at approximately 170° C. The result is indicated in FIG. 4.

It can be appreciated from FIG. 4 that a superior corrosion suppressing function was exhibited when the concentration of dissolved oxygen was not less than approximately 3 ppm. This means that the concentration of dissolved oxygen should be at least approximately 3 ppm. However, from the standpoint of practical usage, it is preferable to use an ammonia solution including dissolved oxygen of an amount where a particular process of adjusting dissolved oxygen is dispensable (approximately 6–8 ppm).

As described in the foregoing, the inventors discovered that molybdate exhibited superior corrosion suppressing function by adding to an ammonia solution including dissolved oxygen of a predetermined concentration a predetermined amount of molybdate according to the amount of dissolved oxygen therein. The inventors carried out testing for selecting the conditions of the adding amount of molybdate and the concentration of dissolved oxygen from the standpoint that molybdate exhibits a superior corrosion suppressing function by adding a minute amount of molybdate. In the present specification, conditions in the vicinity of the lower limit such as an adding amount of 1 wt %–5 wt % molybdate with respect to ammonia solution, and not less than 3 ppm concentration of dissolved oxygen were selected. However, the exhibition of the superior corrosion suppressing function of molybdate is not limited to the above-described condition. For example, molybdate can be considered to exhibit superior corrosion suppressing function even in the case where the amount of molybdate exceeds 5 wt %. In practice, the preferable concentration of dissolved oxygen is 6 ppm to 8 ppm.

By carrying out the above-described qualitative and quantitative corrosion tests, it was discovered that ammonium molybdate exhibited superior corrosion suppressing function similar to that of a conventionally used chromate under predetermined conditions. The comparison in conditions in the case where conventionally used chromate was used and ammonium molybdate was used is shown in Table 3.

TABLE 3

|  | chromate | ammonium molybdate |
|---|---|---|
| Amount of addition | 0.5 wt %–3 wt % | 1 wt %–5 wt % |
| Heating temperature | Approximately 170° C. | Approximately 170° C. |
| Dissolved oxygen | 0.03–8 ppm | 3–8 ppm |
| Component of oxide | $Fe_3O_4$, $Cr_2O_3$ | $Fe_3O_4$, $MoO_2$ |

In the above Table 3, potassium dichromate, ammonium molybdate and the like are conventionally used as chromate. The indicated added amount are typical values and depend upon the size of the area where corrosion is to be carried out. Although the added amount was indicated as 1–5 wt % from the result of the quantitative corrosion test for ammonium molybdate, it is to be considered that the amount is changed according to the size of the area where corrosion suppression is required.

Regarding the concentration of dissolved oxygen, a method of corrosion suppression by dissolved oxygen removal is known. It is generally considered that the corrosion suppressing function is improved in proportion to the decrease of the amount of dissolved oxygen. In comparison with chromate which is superior in corrosion suppressing function on account of its strong oxidation regardless of the amount of dissolved oxygen, ammonium molybdate has the amount of dissolved oxygen increased for the purpose of attaining the assistance of the oxidation of dissolved oxygen.

Regarding the component of oxide, a composite thin layer of ferrosoferric oxide ($Fe_3O_4$) and chromium oxide ($Cr_2O_3$) is generated in the case of chromate, and a composite thin layer of ferrosoferric oxide ($Fe_3O_4$) and molybdenum oxide ($MoO_2$) is generated in the case of ammonium molybdate. Regarding the heating temperature, a fine and favorable ferrosoferric oxide ($Fe_3O_4$) is generated on the surface of the iron based material at a temperature of not less than 130° C. Because the heating temperature of the current absorption refrigerating machine is approximately 170° C., a fine and favorable ferrosoferric oxide ($Fe_3O_4$) can be formed with chromate and ammonium molybdate. Although the heating temperature of a current absorption refrigerating machine is indicated as approximately 170° C. in the above Table 3 where ammonium molybdate is used, the heating temperature may be at least 130° C.

An embodiment of the present invention will be described hereinafter with reference to FIG. 1. FIG. 1 is a partial perspective view showing the refrigeration cycle of a diffusion refrigerating machine for a small refrigerator as an example. A generator 21 includes a dilute solution passage pipe 30 of an annular configuration, and a tube-like bubble pump 24 provided therein. An exhaust tube 23 is welded to the outer surface of generator 21 in a heat transmitting manner. A gas burner 22 is provided opposing the lower end of exhaust tube 23 with a predetermined distance therebetween. A condenser 26 and a rectifier 25 are provided at positions higher than generator 21. Condenser 26 is connected to generator 21 via rectifier 25, and to evaporator 27. Evaporator 27 has an internal tube 27a, and is connected to the upper portion of an absorber 28. Absorber 28 is connected to generator 21 via a receiver 29 provided at the lower portion of absorber 28. Dilute solution passage pipe 30 is connected to the upper portion of absorber 28. In FIG. 1, arrow 31 indicates the flow of concentrated ammonia solution, and arrow 32 indicates the flow of dilute ammonia solution. Arrow 33 indicates the flow of vapor and ammonia gas, arrow 34 the flow of hydrogen gas, and arrow 35 the flow of a mixed gas of hydrogen gas and ammonia gas.

Figure 2:
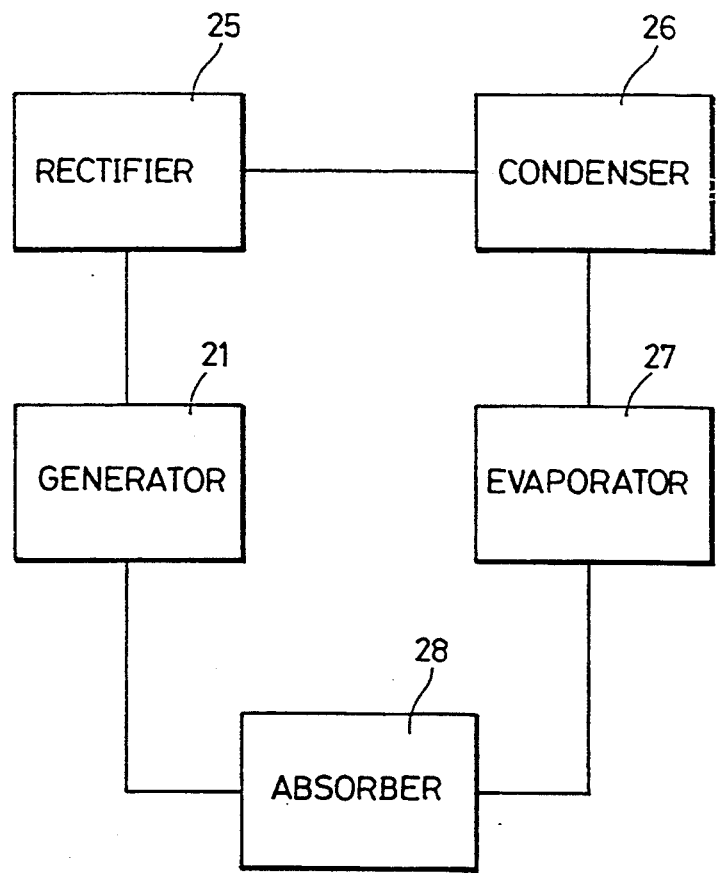
FIG. 2 is a block diagram indicating the refrigeration cycle of the diffusion absorption refrigerating machine according to the embodiment of the present invention.

The operation of the absorption refrigerating machine having the above-described structure will be described with reference to FIGS. 1 and 2. FIG. 2 shows a block diagram of the refrigeration cycle of the absorption refrigerating machine. Gas burner 22 being turned on causes combustion gas of high temperature to be introduced to exhaust tube 23. The heat of combustion gas is conducted to generator 21, whereby generator 21 is heated to approximately 170° C. As a result, vapor and ammonia gas are generated in generator 21. The vapor and ammonia gas are introduced to rectifier 25 (arrow 33). In rectifier 25, only vapor is condensed, whereby the liquefied drops flow along the slanted internal bottom 25a of rectifier 25 through dilute solution passage pipe 30 to absorber 28 (arrow 32). The ammonia gas that was not condensed in rectifier 25 is condensed in condenser 26 to become ammonia solution. The ammonia solution is transferred to evaporator 27 of a double layered structure. Hydrogen gas passing through absorber 28 is fed to evaporator 27 through internal tube 27a (arrow 34). In the proximity of the inlet of evaporator 27 of the condenser 26 side, the ammonia solution from condenser 26 and hydrogen gas are mixed. Then, ammonia solution moves towards absorber 28 through evaporator 27 along the outer periphery of inner tube 27a. During this passage, ammonia solution derives latent heat of gasification from its periphery to be gasified. Thus, refrigeration is carried out. The ammonia gas and hydrogen gas are mixed and move to receiver 29 (arrow 35). The mixed gas enters absorber 28 of a spiral configuration from the lower part thereof towards the upper part. During this passage, ammonia gas is absorbed by dilute ammonia solution fed from dilute solution passage pipe 30 into absorber 28 (arrow 32). Here, hydrogen gas is not absorbed by dilute ammonia solution and is fed again into evaporator 27 (arrow 34).

The dilute ammonia solution fed from pipe 30 flows downwards in absorber 28. As the mixed gas of hydrogen gas and ammonia gas passes from the lower portion to the upper portion of absorber 28, the dilute ammonia solution absorbs the ammonia gas in the mixed gas, resulting in a concentrated ammonia solution. This concentrated ammonia solution is again fed to generator 21 via receiver 29 to complete one cycle. This refrigeration cycle is repeated.

In the above-described operation, the concentration of the concentrated ammonia solution which is the medium is normally approximately 30%. The concentrated ammonia solution is sealed within receiver 29 prior to the operation of the absorption refrigerating machine. Ammonium molybdate is added 1–5% by weight into the concentrated ammonia solution, with a concentration of 6–8 ppm of dissolved oxygen. This concentrated ammonia solution is fed to generator 21 and heated at a temperature of approximately 170° C. As a result, a composite thin layer of molybdenum oxide and ferrosoferric oxide having a superior corrosion protecting effect is formed in the internal surface of the generator where corrosion is significant.

Figure 3:
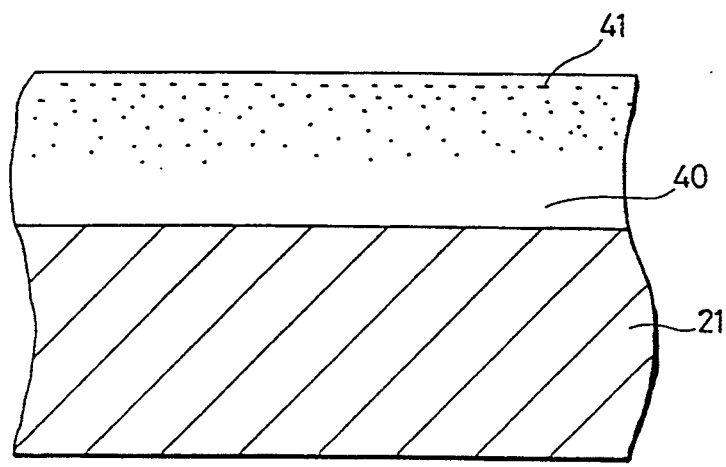
FIG. 3 is a model diagram showing a structure of the composite thin layer formed according to the present invention.

The structure of the composite thin layer formed on the internal surface of generator 21 will be described with reference to FIG. 3. FIG. 3 is a partial enlarged sectional view of a composite thin layer of ferrosoferric oxide 40 and molybdenum oxide 41 on the inner surface of generator 21. A thin layer mainly constituted by ferrosoferric oxide 40 is formed on the inner surface of generator 21, with a thin layer mainly constituted by molybdenum oxide 41 thereabove. In other words, the ratio of ferrosoferric oxide in the composite thin layer is high at the proximity of the interface with the generator and falls off with distance inwards in the radial direction of the generator. Conversely, the ratio of molybdenum oxide is highest at the proximity of the surface of the composite thin layer. The corrosion suppressing effect of a composite thin layer having such a structure is significant.

Figure 5:
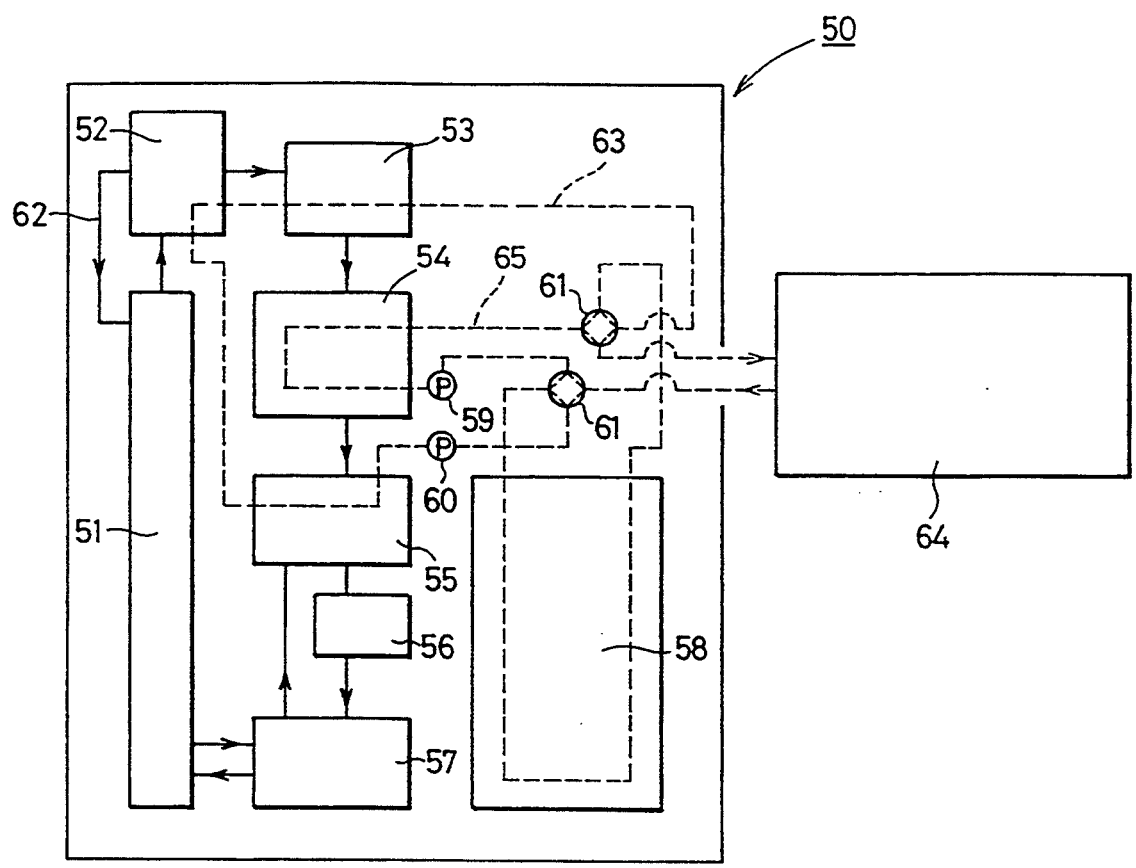
FIG. 5 is a piping system diagram showing a diffusion absorption heating/cooling device according to another embodiment of the present invention.
Figure 6:
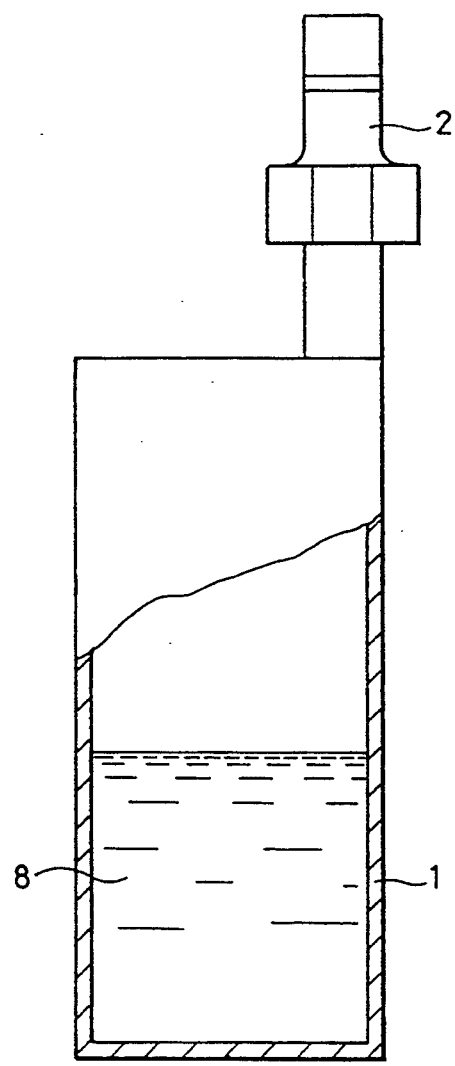
FIG. 6 is a partial sectional view of a test vessel used in qualitative corrosion testing.

Another embodiment of the present invention will be described with reference to FIG. 5. FIG. 5 is a piping system diagram indicating a diffusion absorption heating/cooling device to which the present invention is applied. Referring to FIG. 5, a diffusion absorption heating/cooling device 50 includes a generator 51, a rectifier 52, a condenser 53, an evaporator 54, an absorber 55, a receiver 56, a solution heat exchanger 57, an air heat exchanger 58 and an in-door heat exchange unit 64. The absorption cycle is substantially similar to that of the aforementioned absorption refrigerating machine. In the present embodiment, the absorption cycle is implemented with generator 51, rectifier 52, condenser 53, evaporator 54, absorber 55, receiver 56, solution heat exchanger 57. Ammonia solution circulates as a medium within the absorption cycle. Heat exchange is carried out by the ammonia solution being transformed into a gas-phase state and a liquid-phase state, allowing a cooling or heating operation.

At the time of the cooling operation, evaporator 54 is connected to an in-door heat exchange unit 64 by means of a four-way valve 61 for switching the circuit of heating/cooling supply liquid. In this piping line 63, a cooling circuit supply liquid pump 59 is provided. By means of this cooling circuit supply liquid pump 59, a medium such as brine circulates within piping line 63. A four-way valve 61 is also provided in a piping line 65 which connects rectifier 52, condenser 53, and absorber 55 to air heat exchanger 58. A heating circuit supply liquid pump 60 is provided in piping line 65. By means of heating circuit supply liquid pump 60, brine circulates through piping line 65.

At the time of a heating operation, four-way valve 61 is switched to connect evaporator 54 to air heat exchanger 58. Here, rectifier 52, condenser 53 and absorber 55 are connected to the in-door heat exchange unit 64.

The operation of the diffusion absorption heating/cooling device 50 of the above-described structure will be described hereinafter.

As described above, evaporator 54 and in-door heat exchange unit 64 are connected to each other, whereby brine circulates through piping line 65 thereof at the time of the cooling operation. Brine is cooled within evaporator 54 to be supplied to in-door heat exchange unit 64. Heat is absorbed from the atmosphere of that chamber to cool the inside of the chamber.

Rectifier 52, condenser 53 and absorber 55 are connected to the air heat exchanger 58 by piping line 63. By means of heating circuit supply liquid pump 10, brine circulates piping line 63 to convey the heat generated from rectifier 52, condenser 53, and absorber 55 to the air heat exchanger 58. The heat is discharged outside by the air heat exchanger 58.

The heating operation differs from the cooling operation in that evaporator 54 is connected to heat exchanger 58, and rectifier 52, condenser 53 and absorber 55 are connected to the in-door heat exchange unit 64. The heat generated from rectifier 52, condenser 53, and absorber 55 is evolved inside the chamber. Here, evaporator 54 functions as a heat pump that extracts heat from the atmosphere.

The above-described diffusion absorption heating/cooling device 50 has ammonium molybdate added at least 1% by weight to an ammonia solution in introducing the ammonia solution into receiver 56. The concentration of dissolved oxygen is 6–8 ppm. By operating the diffusion absorption heating/cooling device, a composite thin layer of ferrosoferric oxide and molybdenum oxide can be formed on the inner surface of generator 51 where corrosion is great, as in the case of the aforementioned absorption refrigerating machine. Thus, corrosion in the internal surface of generator 51 can be effectively prevented.

Although the composite thin layer is described to be formed at the initial normal operation of an absorption refrigerating machine or a diffusion absorption heating/cooling device in the above embodiments, a generator having the composite thin layer formed in advance may be incorporated in the above-described device. The composite thin layer does not have to be formed prior to operation if an ammonia solution including molybdate is sealed in the heat exchange cycle of the above-described apparatus. This is because the composite thin layer is inevitably formed at the time of operation if an ammonia solution including molybdate is sealed therein. The heating temperature may be set to various values above 130° C., and the operation for forming the composite thin layer may be carried out in advance. The embodiment is not limited to ammonium molybdate, and any molybdate having a corrosion suppressing function similar to that of ammonium molybdate such as potassium molybdate ($K_2MoO_4$) may be used.

Thus, according to the present invention, a corrosion protecting thin layer of high corrosion resistance can be easily formed on the inside wall of a generator where corrosion is significant in an absorption refrigerating machine. The problems of industrial pollution and toxicity occurring from chromate based corrosion inhibitors are also solved. Therefore, a high corrosion suppressing function without pollution can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process of suppressing corrosion of a heat exchanging apparatus, comprising the steps of:
   preparing ammonia solution including dissolved oxygen of a predetermined concentration,
   adding to said ammonia solution molybdate of an amount according to the concentration of said dissolved oxygen and,
   forming a composite structure including a ferrosoferric oxide and molybdenum oxide in the portion where said ammonia solution is gasified in the internal surface of a heat exchange cycle tube including iron component through which said ammonia solution is circulated, by heating said ammonia solution including said molybdate.

2. The process of suppressing corrosion of a heat exchanging apparatus according to claim 1, said heat exchanging apparatus comprising an absorption refrigerating machine,
   wherein said composite structure is formed in the internal surface of the refrigeration cycle tube located in a generator of said absorption refrigerating machine by heating said ammonia solution including said molybdate.

3. The process of suppressing corrosion of a heat exchanging apparatus according to claim 1, said heat exchanging apparatus comprising a heat pump,
   wherein said composite structure is formed in the internal surface of the heating cycle tube located in a generator of said heat pump by heating said ammonia solution including said molybdate.

4. The process of suppressing corrosion of a heat exchanging apparatus according to claim 1, wherein the concentration of said dissolved oxygen is at least 3 ppm.

5. The process of suppressing corrosion of a heat exchanging apparatus according to claim 1, wherein the concentration of said dissolved oxygen is 6 ppm–8 ppm.

6. The process of suppressing corrosion of a heat exchanging apparatus according to claim 1, wherein the added amount of said molybdate is at least 1 wt %.

7. The process of suppressing corrosion of a heat exchanging apparatus according to claim 1, wherein the added amount of said molybdate is 1 wt %–5 wt %.

8. The process of suppressing corrosion of a heat exchanging apparatus according to claim 1, wherein said molybdate comprises ammonium molybdate.

* * * * *